United States Patent
Feng et al.

(10) Patent No.: US 12,255,378 B2
(45) Date of Patent: Mar. 18, 2025

(54) WINDOW SYSTEM

(71) Applicants: Beijing BOE Sensor Technology Co., Ltd., Beijing (CN); BOE Technology Group Co., Ltd., Beijing (CN)

(72) Inventors: Chunnan Feng, Beijing (CN); Yong Li, Beijing (CN); Yunnan Jin, Beijing (CN); Sihui Bao, Beijing (CN); Zhifeng Zhang, Beijing (CN); Yongsheng Ma, Beijing (CN); Zhi Hou, Beijing (CN); Chuncheng Che, Beijing (CN); Feng Qu, Beijing (CN); Biqi Li, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,978

(22) PCT Filed: Jan. 28, 2022

(86) PCT No.: PCT/CN2022/074519
§ 371 (c)(1),
(2) Date: Jan. 31, 2023

(87) PCT Pub. No.: WO2023/141919
PCT Pub. Date: Aug. 3, 2023

(65) Prior Publication Data
US 2024/0258680 A1     Aug. 1, 2024

(51) Int. Cl.
*H01Q 1/12* (2006.01)
*G02F 1/1333* (2006.01)
(Continued)

(52) U.S. Cl.
CPC ..... *H01Q 1/1271* (2013.01); *G02F 1/133302* (2021.01); *G02F 1/134309* (2013.01);
(Continued)

(58) Field of Classification Search
CPC ............ H01Q 1/1271; G02F 1/133302; G02F 1/134309
See application file for complete search history.

(56) References Cited

U.S. PATENT DOCUMENTS

2006/0132014 A1* 6/2006 Horiuchi ................ G02B 5/208
313/308

FOREIGN PATENT DOCUMENTS

| CN | 101459285 A | 6/2009 |
|---|---|---|
| CN | 104241865 A | 12/2014 |

(Continued)

*Primary Examiner* — Lucy P Chien
(74) *Attorney, Agent, or Firm* — Nath, Goldberg & Meyer; Joshua B. Goldberg (57) ABSTRACT

A window system is provided, and belongs to the field of window technology. The window system provided by the present disclosure includes a first transparent substrate and a second transparent substrate opposite to each other, and a radiation structure and a dimming structure sequentially arranged on a side of the first transparent substrate close to the second transparent substrate; wherein an orthographic projection of the dimming structure on the first transparent substrate at least partially overlaps an orthographic projection of the radiation structure on the first transparent substrate. The window system provided by the present disclosure can have functions of transmitting and receiving radio frequency signals as well as dimming, and the radiation structure and the dimming structure are stacked together to save space.

12 Claims, 10 Drawing Sheets

(51) Int. Cl.
*G02F 1/1343* (2006.01)
*G02F 1/137* (2006.01)
(52) U.S. Cl.
CPC .......... *G02F 1/137* (2013.01); *G02F 2202/04* (2013.01); *G02F 2202/06* (2013.01)

(56) References Cited

FOREIGN PATENT DOCUMENTS

| | | |
|---|---|---|
| CN | 111845820 A | 10/2020 |
| CN | 112736407 A | 4/2021 |
| CN | 113054437 A | 6/2021 |
| CN | 213501797 U | 6/2021 |
| JP | 2017106984 A | 6/2017 |

\* cited by examiner

WINDOW SYSTEM

This is a National Phase Application filed under 35 U.S.C. 371 as a national stage of PCT/CN2022/074519, filed Jan. 28, 2022, the content of which is hereby incorporated by reference in its entirety.

TECHNICAL FIELD

The present disclosure relates to the field of window technology, and in particular to a window system.

BACKGROUND

At present, with the deepening of the intellectualization of families and vehicles, there is an increasing demand for the types of antennas. For example, in the vehicle-mounted antenna, in addition to the traditional electronic devices with radio, navigation and other functions, there is also the demand for multi-frequency communication, tire pressure monitoring, remote data processing and so on in the era of the Internet of Vehicles. The demand for the car antenna will gradually expand. And the dimming structure is more and more widely used in the fields of architecture and transportation.

SUMMARY

The present disclosure intends to solve at least one of the technical problems in the prior art, and provides a window system, which has functions of transmitting and receiving radio frequency signals and dimming, and a radiation structure and a dimming structure are stacked together to save space.

A technical solution for solving the technical problem of the present disclosure is a window system, including: a first transparent substrate and a second transparent substrate opposite to each other, and a radiation structure and a dimming structure sequentially on a side of the first transparent substrate close to the second transparent substrate; wherein an orthographic projection of the dimming structure on the first transparent substrate at least partially overlaps an orthographic projection of the radiation structure on the first transparent substrate.

In some examples, the radiation structure includes: a first substrate and a second substrate opposite to each other, wherein the first substrate is on a side of the first transparent substrate close to the dimming structure, and the second substrate is on a side of the dimming structure close to the first transparent substrate;
 a feeding structure on a side of the first substrate close to the second substrate; and a radiation coupling layer on a side of the second substrate close to the first substrate, wherein the feeding structure and the radiation coupling layer have a first spacing therebetween.

In some examples, the radiation coupling layer is provided with a slit, and an orthographic projection of the slit on the second substrate at least partially overlaps with an orthographic projection of the feeding structure on the second substrate.

In some examples, an arrangement direction of the feeding structure is at least partially different from that of the slit.

In some examples, the slit includes a first sub-slit extending along a first direction, and a second sub-slit and a third sub-slit respectively connected to both ends of the first sub-slit and each extending along a second direction, wherein the first direction intersects with the second direction; and an extending direction of the feeding structure is substantially the same as the first direction, and intersects with the second direction, and the orthographic projection of the feeding structure on the second substrate does not overlap an orthographic projection of the first sub-slit on the second substrate.

In some examples, the radiation coupling layer is formed by a plurality of first wires crossing each other and broken at the slit.

In some examples, each first wire includes a plurality of first sub-wires broken at the slit; and the first sub-wires of different first wires are broken at the slit; or the first sub-wires of different first wires are short-circuited at the slit.

In some examples, the feeding structure is formed by a plurality of second wires crossing each other.

In some examples, each second wire includes a plurality of second sub-wires; the second sub-wires of different second wires are disconnected at an edge of the feeding structure; or the second sub-wires of different second wires are short-circuited at the edge of the feeding structure.

In some examples, the radiation coupling layer is formed by a plurality of first wires crossing each other and broken at the slit; and the feeding structure is formed by a plurality of second wires crossing each other; and wherein orthographic projections of hollowed-out portions formed by the plurality of first wires and hollowed-out portions formed by the plurality of second wires on the second substrate substantially overlap each other.

In some examples, the radiation coupling layer is formed by a plurality of first wires crossing each other and broken at the slit; and wherein a unit area of the orthographic projection of the feeding structure on the second substrate is greater than that of the orthographic projection of the radiation coupling layer on the second substrate.

In some examples, the dimming structure includes at least one glass module; and each glass module includes a first base substrate and a second base substrate opposite to each other and a dimming layer; and wherein the dimming layer is configured to adjust light transmittance according to an electric field generated between the first base substrate and the second base substrate; and the second base substrate is closer to the second transparent substrate than the first base substrate.

In some examples, the first base substrate includes a third substrate, and a first electrode layer on a side of the third substrate close to the second base substrate; the second base substrate includes a fourth substrate, and a second electrode layer on a side of the fourth substrate close to the first base substrate; and the dimming layer is a dye liquid crystal layer.

In some examples, the radiation structure includes: a first substrate and a second substrate opposite to each other; wherein the first substrate is on a side of the first transparent substrate close to the dimming structure, and the second substrate is on a side, close to the first transparent substrate, of the third substrate of the glass module closest to the first transparent substrate; the feeding structure is on a side of the first substrate close to the second substrate; and the radiation coupling layer is on a side of the second substrate close to the first substrate; and wherein the third substrate is further used as the second substrate.

In some examples, the first transparent substrate is further used as the first substrate.

In some examples, the radiation structure further includes: a reference electrode layer; and wherein the window system is applied to a window of a vehicle, and a housing of the vehicle is further used as the reference electrode layer.

In the window system according to the present disclosure, the radiation structure and the dimming structure are integrated as a one-piece structure, so that the window system has the functions of transmitting and receiving radio frequency signals and dimming, without an additional antenna and an individual dimming structure. Further, the radiation structure and the dimming structure are stacked together, which can save space.

DETAIL DESCRIPTION OF EMBODIMENTS

In order to enable one of ordinary skill in the art to better understand the technical solutions of the present disclosure, the present disclosure will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that in the present disclosure, two structures being "disposed in a same layer" means that they are formed of a same material layer, and thus they are in a same layer in a stacking relationship, but does not mean that they are equidistant from a substrate, and does not mean that each of the two structures has a structure completely the same as that of any other layer between the two structures and the substrate.

The present disclosure will be described in more detail below with reference to the accompanying drawings. Like elements are denoted by like reference numerals throughout the drawings. For purposes of clarity, various features in the drawings are not drawn to scale. Moreover, some well-known features may not be shown in the drawings.

It should be noted that a first direction X, a second direction Y, and a third direction Z intersect with each other two by two in the present disclosure. In the present disclosure, the first direction X and the second direction Y are perpendicular to each other in a plane where the window system is located, and the third direction Y is perpendicular to the plane where the window system is located.

Figure 1:
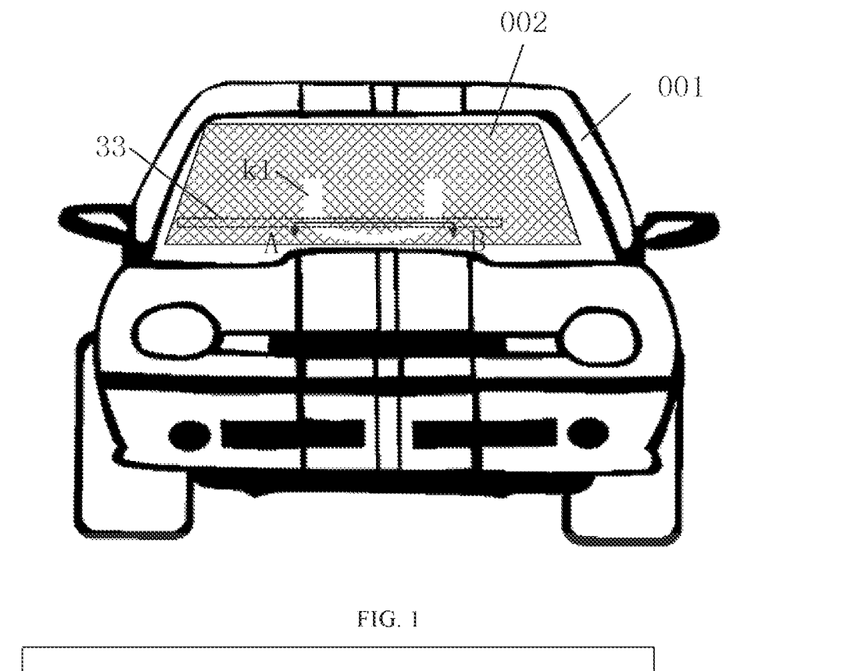
FIG. 1 is a schematic diagram of an overall structure of a window system applied for a vehicle window provided by the present disclosure.

The embodiment of the present disclosure provides a window system, which can be applied to various scenes such as buildings or mobile tools or the like. For example, the window system in FIG. 1 is applied to a vehicle. That is, the window system 002 is installed in a window frame on a vehicle housing 001 as a vehicle window. Alternatively, the window system provided by the present disclosure is not limited to the application scene shown in FIG. 1, but for convenience of description, the window system is taken as a vehicle window in the following description.

Figure 2:
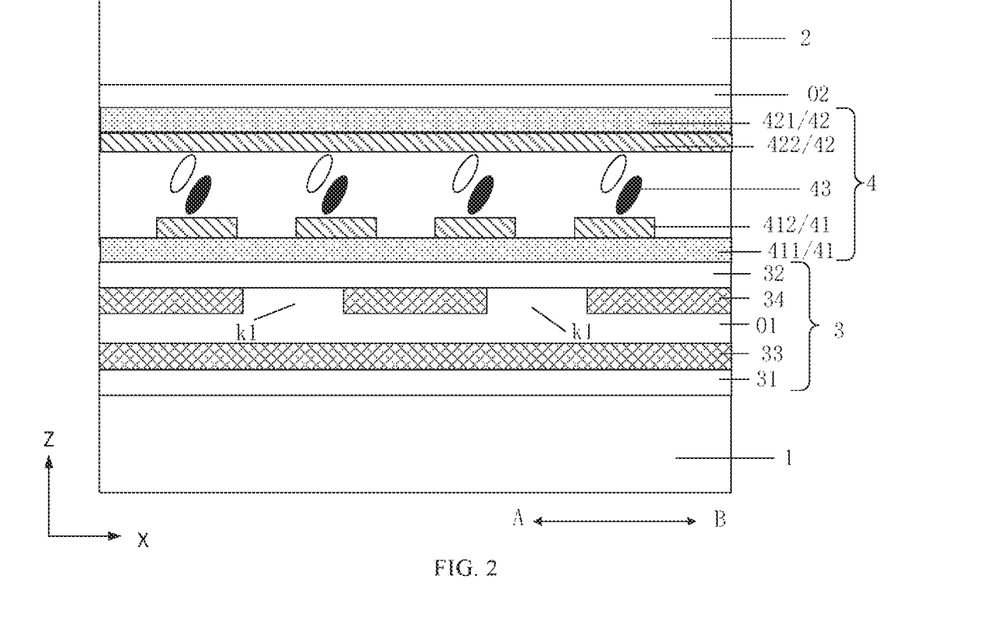
FIG. 2 is an exemplary cross-sectional view of a window system provided by the present disclosure taken along a line A-B of FIG. 1.
Figure 3:
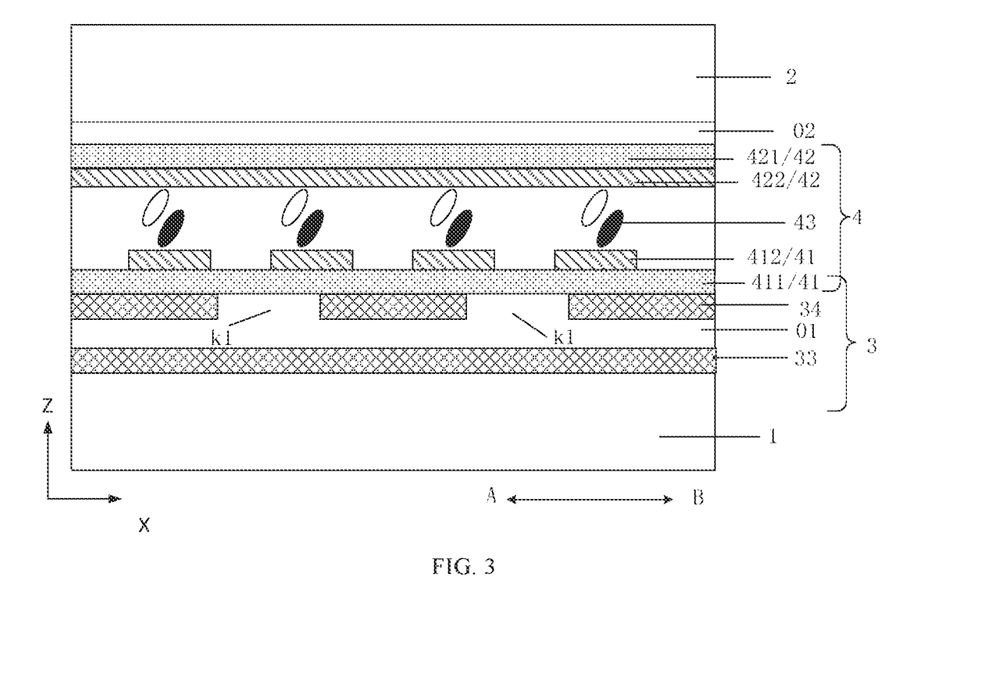
FIG. 3 is another exemplary cross-sectional view of a window system provided by the present disclosure taken along a line A-B in FIG. 1.

Referring to FIGS. 1 to 3, FIGS. 2 and 3 are cross-sectional views showing two embodiments of the window system taken along a line A-B of FIG. 1, respectively. The window system provided by the embodiment of the present disclosure includes a first transparent substrate 1 and a second transparent substrate 2 opposite to each other, and a radiation structure 3 and a dimming structure 4 sequentially disposed on a side of the first transparent substrate 1 close to the second transparent substrate 2.

The first transparent substrate 1 and the second transparent substrate 2 are outermost glasses of the window system, and the radiation structure 3 and the dimming structure 4 are sandwiched between the first transparent substrate 1 and the second transparent substrate 2 to ensure that the window system has a good performance of heat preservation and noise reduction. The dimming structure 4 and the radiation structure 3 are stacked together. In other words, an orthographic projection of the dimming structure 4 on the first transparent substrate 1 at least partially overlaps an orthographic projection of the radiation structure 3 on the first transparent substrate 1. In the window system provided by the present disclosure, the radiation structure 3 and the dimming structure 4 are integrated as a one-piece structure, so that the window system has the functions of transmitting and receiving radio frequency signals and dimming, without a separate radiation structure and a separate dimming structure. Further, the radiation structure 3 and the dimming structure 4 are stacked, which can save space. The radiation structure 3 is arranged parallel to a plane where the window is located, so that the radiation structure 3 has a great coupling surface, and thus, has a better gain effect.

In some examples, referring to FIGS. 2 to 7, the radiation structure 3 includes a first substrate 31 and a second substrate 32 opposite to each other, a feeding structure 33, and a radiation coupling layer 34. The first substrate 31 is disposed on a side of the first transparent substrate 1 close to the dimming structure 4, the second substrate 32 is disposed on a side of the dimming structure 4 close to the first transparent substrate 1, the feeding structure 33 is disposed on a side of the first substrate 31 close to the second substrate 32, the radiation coupling layer 34 is disposed on a side of the second substrate 32 close to the first substrate 31, and the feeding structure 33 and the radiation coupling layer 34 have a first spacing therebetween to prevent the feeding structure 33 and the radiation coupling layer 34 from being short-circuited.

In some examples, a first adhesive layer 01 may be disposed between the radiation coupling layer 34 and the feeding structure 33, and have a certain thickness and have an insulation function, and can adhere the radiation coupling layer 34 to the feeding structure 33 as a one-single piece, and can support the radiation coupling layer 34 and the feeding structure 33 to provide the first spacing therebetween. Specifically, the first adhesive layer 01 may be made of a polyvinyl butyral (PVB) adhesive.

In some examples, the radiation structure 3 may adopt various types of structures, such as a patch antenna, a slot antenna or the like. By taking the slot antenna as an example herein, referring to FIG. 4, in the radiation structure 3, the radiation coupling layer 34 is provided with a slit k1, an orthographic projection of the slit k1 on the second substrate 32 at least partially overlaps with an orthographic projection of the feeding structure 33 on the second substrate 32, and the orthographic projection of the feeding structure 33 on the second substrate 32 penetrates through the orthographic projection of the slit k1 on the second substrate 32. The feeding structure 33 is coupled to the radiation coupling layer 34 to form a new resonant structure, and the feeding structure 33 and the radiation coupling layer 34 arranged parallel to the plane where the window is located have a larger coupling surface therebetween, so that a radio frequency signal can be radiated out through the slit k1 to realize signal transmission, or a radio frequency signal can be coupled to the feeding structure 33 through the slit k1 to realize signal reception. By changing a shape of the slit k1, for example, as an annular slit, the radiation coupling layer 34 and the feeding structure 33 form an annular coupling, so that a radiation performance of the radio frequency signal in a required frequency band in a horizontal direction can be changed, and therefore, the gain and the return loss of the radiation structure 3 in the horizontal direction can be improved.

In some examples, in the radiation structure 3 of the window system provided by the present disclosure, specific shapes and arrangement directions of the feeding structure 33 and the slit k1 in the radiation coupling layer 34 may be implemented in various ways. For example, the feeding structure 33 may include a plurality of feeding lines arranged side by side in straight lines. Alternatively, the feeding structure 33 may include two feeding lines arranged in straight lines and including feeding ends opposite to each other and spaced from each other. Alternatively, the feeding structure 33 includes a feeding line in a meander line or a straight line. Specifically, it may be arranged as needed, and therefore, is not limited herein. In the present disclosure, as an example, the feeding structure 33 includes a feeding line in a straight line for illustration, which does not limit the present disclosure.

Further, a specific shape and arrangement direction of the slit k1 in the radiation coupling layer 34 may also be implemented in various ways. For example, the slit k1 is a rectangular slit arranged in a length direction of the rectangular slit. Alternatively, the slit k1 is an annular slit arranged in a plurality of directions along a periphery of the annular slit. Alternatively, the slit k1 may be a U-shaped slit arranged in a plurality of directions according to bent portions of the U-shape slit.

The feeding structure 33 is arranged in at least partially different direction from the slit k1. In other words, at least one of the arrangement directions of the parts of the feeding structure 33 intersects with one of the arrangement directions of the parts of the slit k1.

Figure 4:
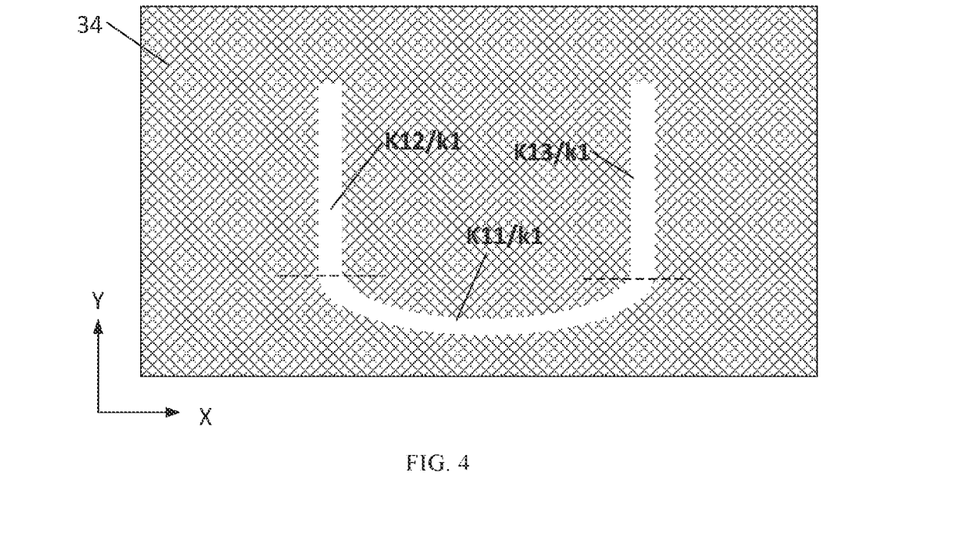
FIG. 4 is a schematic diagram of a planar structure of a radiation coupling layer of a window system provided by the present disclosure.

In some examples, referring to FIG. 4, the slit k1 in the radiation coupling layer 34 includes a first sub-slit k11 extending along a first direction X, and a second sub-slit k12 and a third sub-slit k13 connected to both ends of the first sub-slit k11 and extending along a second direction Y, wherein the first direction X intersects with the second direction Y. An extending direction of the feeding structure 33 is substantially the same as the first direction X, and intersects with the second direction Y, and the orthographic projection of the feeding structure 33 on the second substrate 32 does not overlap an orthographic projection of the first sub-slit k11 on the second substrate 32, but penetrates through orthographic projections of the second sub-slit k12 and the third sub-slit k13 on the second substrate 32. With this arrangement, the radiation coupling layer 34 and the feeding structure 33 form an annular coupling, so that a radiation performance of the radio frequency signal in a required frequency band in a horizontal direction can be changed, and therefore, the gain and the return loss of the radiation structure 3 in the horizontal direction can be improved.

It should be noted that the first sub-slit k11 extending in the first direction X does not mean that the shape of the first sub-slit k11 is strictly parallel to the first direction X, as long as an extending tendency of the first sub-slit k11 is substantially along the first direction X.

Figure 8:
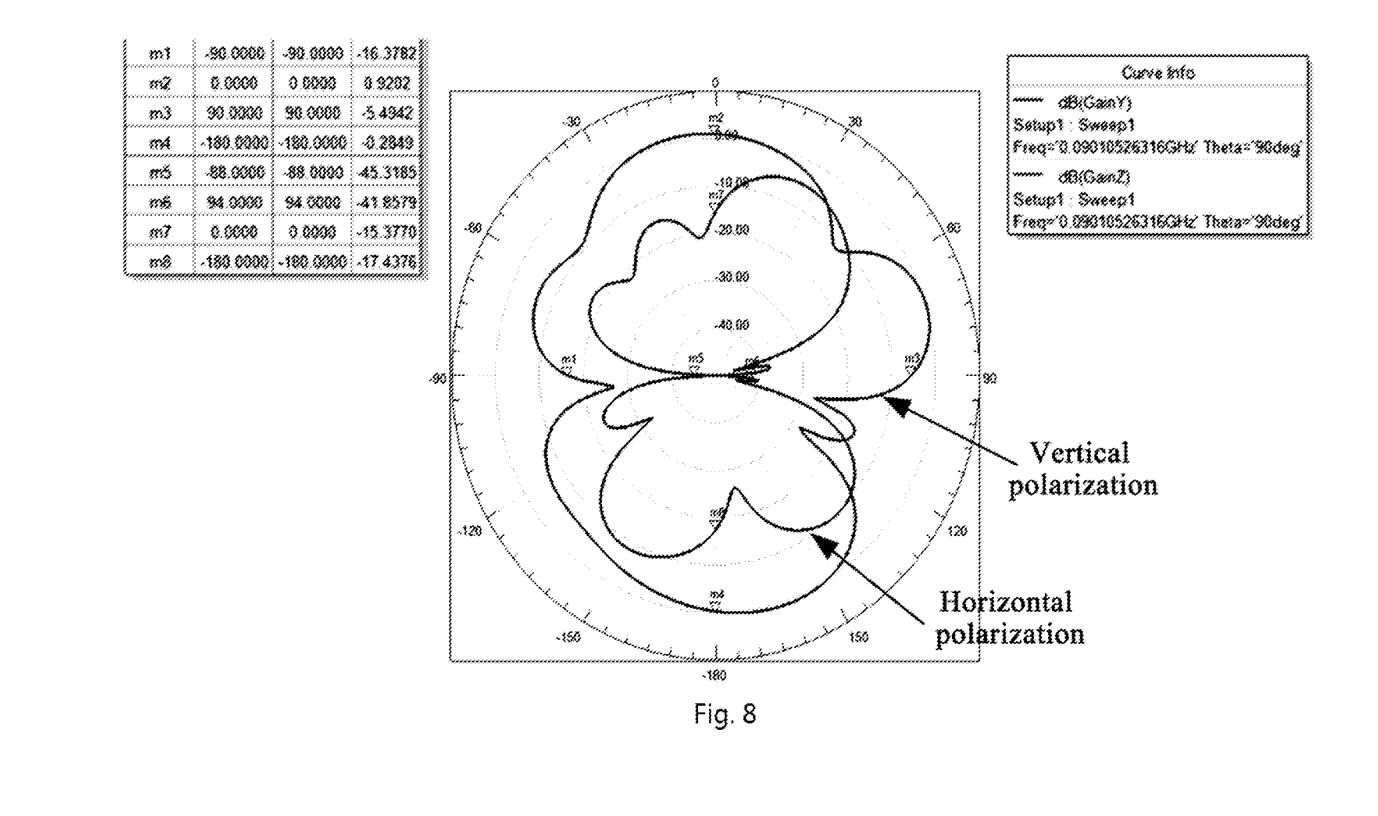
FIG. 8 is a radiation pattern showing vertical and horizontal polarization for a conventional radiation structure.
Figure 9:
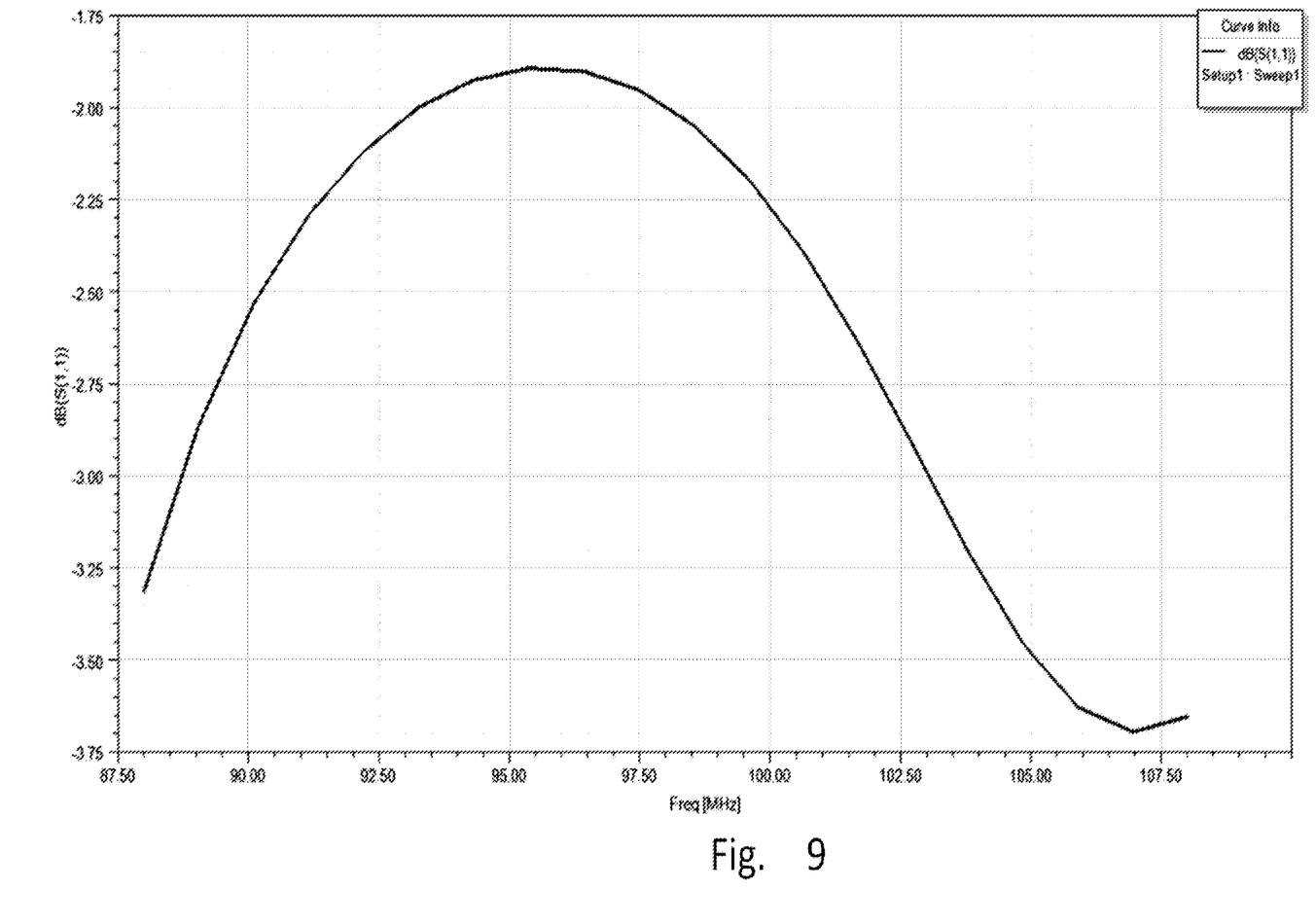
FIG. 9 is a plot showing a return loss for a conventional radiation structure.
Figure 10:
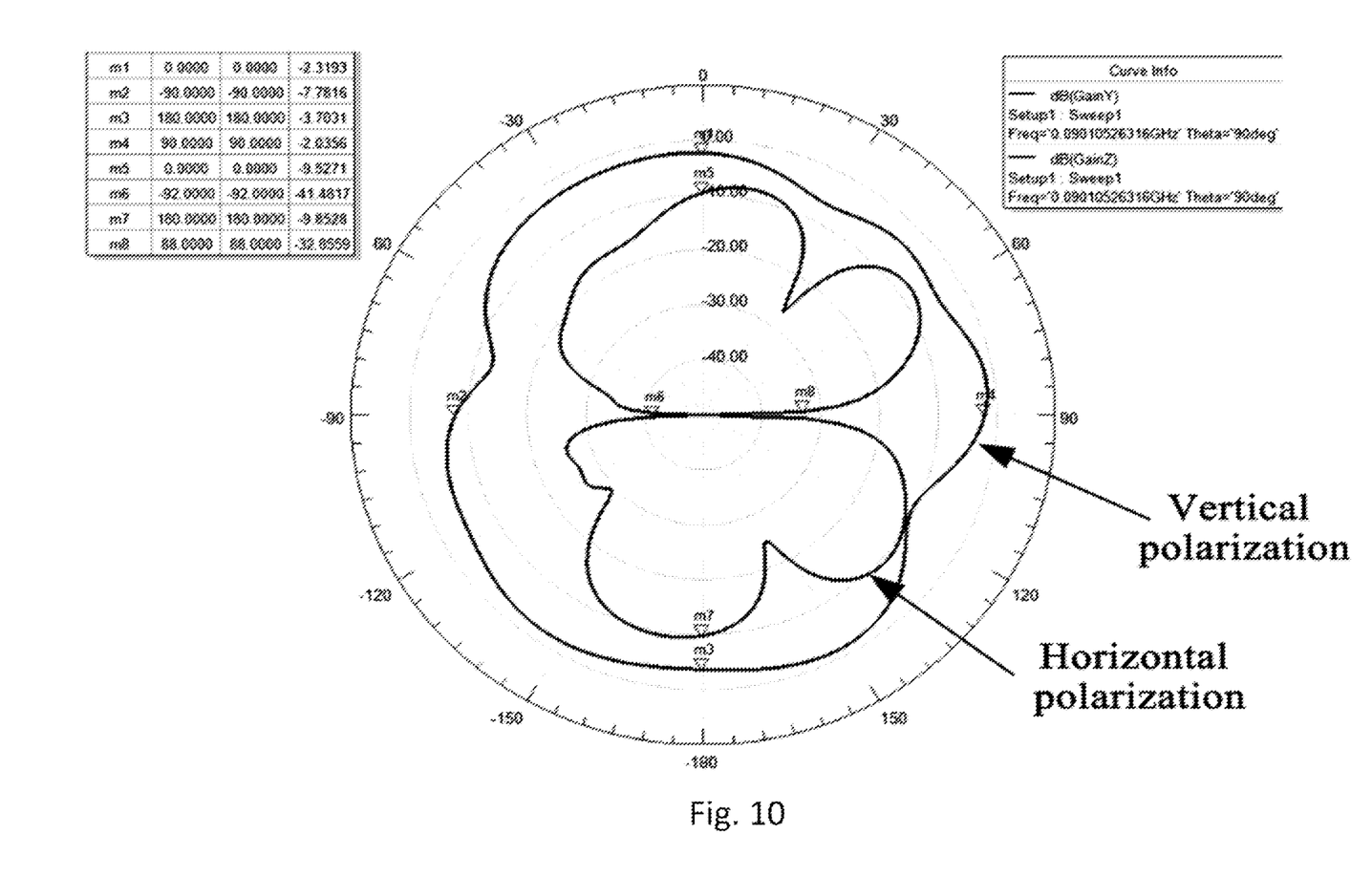
FIG. 10 is a radiation pattern showing vertical and horizontal polarization of a radiation structure in a window system provided by the present disclosure.
Figure 11:
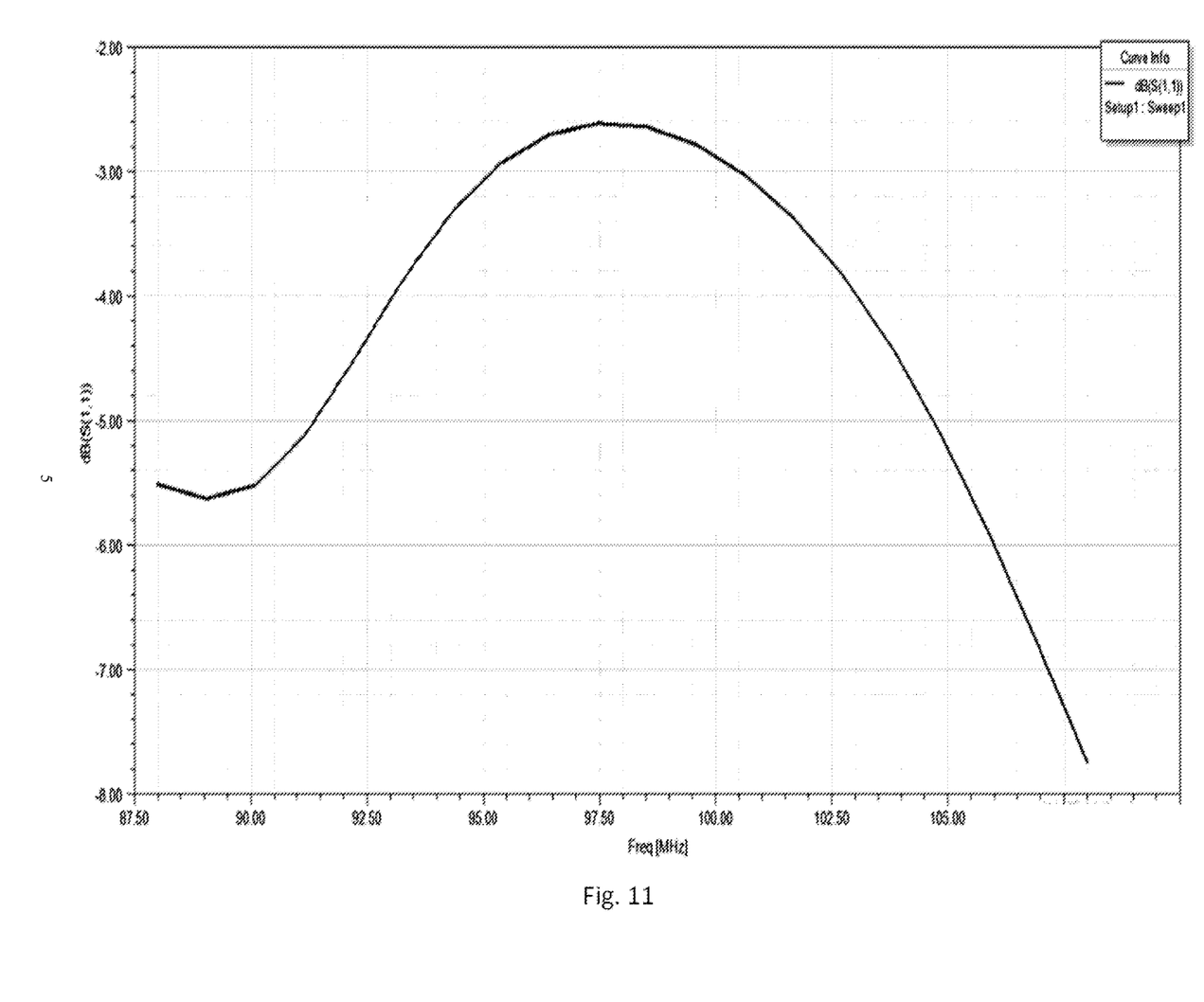
FIG. 11 is a plot showing a return loss of a radiation structure in a window system provided by the present disclosure.

Specifically, referring to FIGS. 8 and 9, in the related art, a conventional radiation structure includes a first substrate and a feeding structure disposed on the first substrate. FIG. 8 is a radiation pattern showing vertical and horizontal polarization simulated for the conventional radiation structure, and FIG. 9 is a plot showing a return loss simulated for the conventional radiation structure. It can be seen that the gain in the horizontal direction has a worse effect, and the return loss is about −1.86 dB. Referring to FIGS. 10 and 11, taking the simulation for the radiation structure in the window system provided by the present disclosure as an example, the slit k1 is a U-shaped slit, the feeding structure 33 is a feeding line arranged in a straight line. FIG. 10 is a radiation pattern showing a vertical polarization and a horizontal polarization of a radiation structure in a window system provided by the present disclosure. It can be seen that the gain in the horizontal direction is effectively improved compared with the conventional radiation structure of FIG. 8. FIG. 11 is a plot showing a return loss of a radiation structure in a window system provided by the present disclosure. It can be seen that the return loss is increased to −2.50 dB compared with the conventional radiation structure. Therefore, the radiation structure in the window system provided by the present disclosure effectively improves the radiation performance of the radiation structure.

In some examples, the radiation structure 3 further includes a reference electrode layer (not shown) as a ground configured to provide a reference potential for the feeding structure 33. In the case where the window system is applied in the window of the vehicle, referring to FIG. 1, the housing 001 of the vehicle is further used as the reference electrode layer of the radiation structure 3. Because the housing 001 of the vehicle itself is made of a metal conductive material, the housing 001 may be further used as the reference electrode layer of the vehicle-mounted radiation structure, the feeding structure 33 may be coupled to the housing of the vehicle, thereby forming a loop for an electromagnetic signal to convert an electrical signal into an electromagnetic wave signal.

In some examples, the radiation coupling layer 34 may be formed through a metal mesh process. That is, the radiation coupling layer 34 may be formed by a plurality of first wires crossing each other and broken at the slit k1, to form the slit k1. The plurality of first wires crossing each other form a whole layer of metal conductive film on a side of the second substrate 32 close to the first transparent substrate 1, and then the metal conductive film is attached to the side of the second substrate 32 close to the first transparent substrate 1; the metal conductive film of the radiation coupling layer 34 includes a base material layer and a metal mesh layer formed on a side of the base material layer close to the first transparent substrate 1. Specifically, the base material layer may be made of polyethylene glycol terephthalate (PET) film material; a metal material layer is formed on a PET film layer, and the metal mesh layer is formed through photoetching or imprinting, thereby forming the metal conductive film. A material of each first wire (i.e., a material of the metal material layer) may be made of various conductive materials, such as copper, silver, aluminum, and other metal materials, which is not limited herein.

Figure 5:
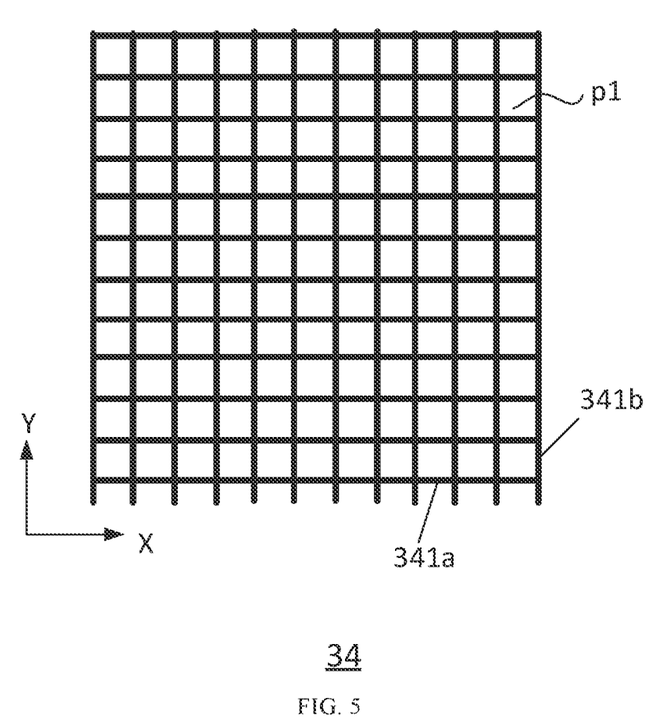
FIG. 5 is a schematic diagram of a partial structure of a radiation coupling layer of a window system provided by the present disclosure.

Specifically, referring to FIG. 5. FIG. 5 shows a partial area of the metal mesh of the radiation coupling layer 34, which includes a plurality of horizontal first wires 341a extending along the first direction X and a plurality of vertical second wires 341b extending along the second direction Y, where the plurality of horizontal first wires 341a and the plurality of vertical second wires 341b cross each other, thereby forming a plurality of hollowed-out portions p1 at crossing points. It should be noted that the first wires of the radiation coupling layer 34 may extend along various directions, which is only for illustration and is not intended to limit the present disclosure.

In some examples, each first wire has a line width in a range of 2 μm to 30 μm; a distance between any two adjacent first wires in the first wires extending along the same direction is in a range of 50 μm to 200 μm; each first wire has a thickness in a range of 1 μm to 10 μm, and the entire radiation coupling layer 34 (i.e., the metal conductive film) has a thickness in a range of 55 μm to 155 μm. A size and a line width of each first wire, the distance between any two adjacent first wires, and a thickness of the first wire are in a micro-scale and therefore cannot be recognized by eyes, and the distance between any two adjacent first wires is much greater than the line width of each first wire, so that the spacing between any two adjacent first wires in the plurality of first wires crossing each other is large enough, which can form the transparent film layer and prevent the plurality of first wires from blocking light, and therefore ensure that the radiation coupling layer 34 formed by the plurality of first wires has a good light transmittance. In this way, it can be ensured that the window system integrated with the radiation structure 3 has a good light transmittance.

In some examples, each first wire includes a plurality of first sub-wires broken at the slit k1 to form the slit k1. The first sub-wires of different first wires are broken at the slit k1, to form an open structure. Alternatively, the first sub-wires of different first wires are short-circuited at the slit to form a closed structure, which is not limited herein.

Figure 6:
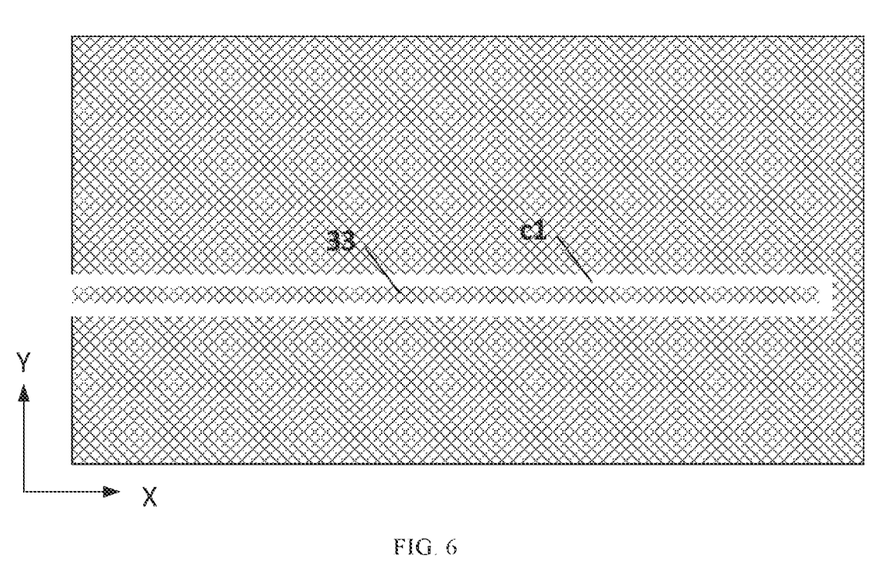
FIG. 6 is a schematic diagram of a planar structure (metal mesh) of a feeding structure of a window system provided by the present disclosure.
Figure 7:
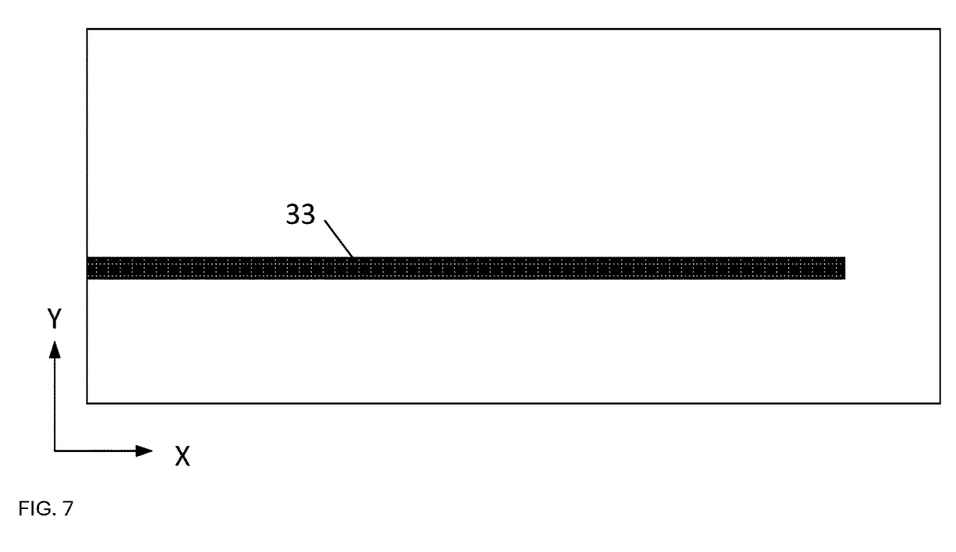
FIG. 7 is a schematic diagram of a planar structure (metal wire) of a feeding structure of a window system provided by the present disclosure.

In some examples, referring to FIG. 6, the feeding structure 33 may be formed through a metal mesh process. That is, the feeding structure 33 may be formed by a plurality of second wires crossing each other. The plurality of second wires crossing each other form a whole layer of metal conductive film on a side of the first substrate 31 close to the second transparent substrate 2; an opening cl is provided in the metal conductive film, and separates the feeding structure 33 and the metal conductive film from each other. Then, the metal conductive film is attached to the side of the first substrate 31 close to the second transparent substrate 2. The metal conductive film of the feeding structure 33 includes a base material layer and a metal mesh layer formed on a side of the base material layer close to the second transparent substrate 2. Specifically, the base material layer may be made of polyethylene glycol terephthalate (PET) film material; a metal material layer is formed on a PET film layer, and the metal mesh layer is formed through photoetching or imprinting, thereby forming the metal conductive film. A material of each second wire (i.e., a material of the metal material layer) may be made of various conductive materials, such as copper, silver, aluminum, and other metal materials, which is not limited herein.

In some examples, each second wire has a line width in a range of 2 μm to 30 μm; a distance between any two adjacent second wires in the second wires extending along the same direction is in a range of 50 μm to 200 μm; each second wire has a thickness in a range of 1 to 10 μm, and the entire feeding structure 33 (i.e., the metal conductive film) has a thickness in a range of 55 μm to 155 μm. A size and a line width of each second wire, the distance between any two adjacent second wires, and the thickness of the second wire are in a micro-scale and therefore cannot be recognized by eyes, and the distance between any two adjacent second wires is much greater than the line width of each second wire, so that the spacing between any two adjacent second wires in the plurality of second wires crossing each other is large enough, which can form the transparent film layer and prevent the plurality of second wires from blocking light, and therefore ensure that the feeding structure 33 formed by the plurality of second wires has a good light transmittance. In this way, it can be ensured that the window system integrated with the radiation structure 3 has a good light transmittance.

In some examples, each second wire includes a plurality of second sub-wires. The second sub-wires of different second wires are disconnected at an edge of the feeding structure 33, to form an open structure. Alternatively, the second sub-wires of different second wires are short-circuited at the edge of the feeding structure 33 to form a closed structure, which is not limited herein.

In some examples, the radiation coupling layer 34 and the feeding structure 33 both adopt a metal mesh structure. That is, the radiation coupling layer 34 is formed by the plurality of first wires crossing each other and broken at the slit k1; the feeding structure 33 is formed by the plurality of second wires crossing each other, orthographic projections of the hollowed-out portions (for example, as shown in p1 of FIG.

5) formed by the plurality of first wires and the hollowed-out portions (similar to p1 of FIG. 5) formed by the plurality of second wires on the second substrate 32 substantially overlap each other. In other words, an extending direction of the plurality of first wires is substantially the same as that of the plurality of second wires.

In some examples, the feeding structure 33 may be formed by using a whole metal wire instead of the metal mesh. That is, the feeding structure 33 does not have hollowed-out portions. In this case, the radiation coupling layer 34 is formed by the plurality of first wires crossing each other and broken at the slit k1. A unit area of the orthographic projection of the feeding structure 33 on the second substrate 32 is greater than that of the orthographic projection of the radiation coupling layer 34 on the second substrate 32.

In some examples, referring to FIG. 2 and FIG. 3, the dimming structure 4 includes at least one glass module. It should be noted that FIG. 2 and FIG. 3 both illustrate that the dimming structure 4 includes one glass module as an example, and thus the glass module is the dimming structure. Each glass module includes a first base substrate 41 and a second base substrate 42 opposite to each other, and a dimming layer 43 arranged between the first base substrate 41 and the second base substrate 42, wherein the second base substrate 42 is closer to the second transparent substrate 2 than the first base substrate 41. The dimming layer 43 is configured to adjust light transmittance according to an electric field generated between the first base substrate 41 and the second base substrate 42. For example, the light transmittance varies in a range of 0% to 100%.

In some examples, for one glass module, the first base substrate 41 includes a third substrate 411, and a first electrode layer 412 disposed on a side of the third substrate 411 close to the second base substrate 42. The second base substrate 42 includes a fourth substrate 421, and a second electrode layer 422 disposed on a side of the fourth substrate 421 close to the first base substrate 41. A first direct voltage is applied to electrodes of the first electrode layer 412 and a second direct voltage is applied to the second electrode layer 422, so that an electric field is generated between the first electrode layer 412 and the second electrode layer 422, thereby adjusting the transmittance of the dimming layer 43.

In some examples, the dimming layer 43 includes various types of dimming media. For example, the dimming layer 43 may be a dye liquid crystal layer. A material of the dye liquid crystal layer includes liquid crystal molecules and dichroic dye molecules, and a deflection direction of the liquid crystal molecules is controlled by the electric field generated between the first electrode layer 412 and the second electrode layer 422, so that the transmittance of the dimming layer 43 can be adjusted.

In some examples, the dimming structure 4 may include a plurality of glass modules. For example, referring to the dimming structure 4 shown in FIGS. 12 and 13, the dimming structure 4 includes a first glass module 4A and a second glass module 4B; the first glass module 4A includes the first base substrate 41 and the second base substrate 42 opposite to each other, and the dimming layer 43 disposed between the first base substrate 41 and the second base substrate 42, wherein the first base substrate 41 includes the third substrate 411, and the first electrode layer 412 disposed on the side of the third substrate 411 close to the second base substrate 42. The second base substrate 42 includes the fourth substrate 421, and the second electrode layer 422 disposed on the side of the fourth substrate 421 close to the first base substrate 41. Similarly, the second glass module 4B includes a first base substrate 51 and a second base substrate 52 opposite to each other, and a dimming layer 53 disposed between the first base substrate 51 and the second base substrate 52, wherein the first base substrate 51 includes a third substrate 511, and a first electrode layer 512 disposed on a side of the third substrate 511 close to the second base substrate 52. The second base substrate 52 includes a fourth substrate 521, and a second electrode layer 522 disposed on a side of the fourth substrate 521 close to the first base substrate 51. The first dimming module 4A is disposed closer to the first transparent substrate 1 than the second dimming module 4B, and the second base substrate 42 of the first dimming module 4A and the first base substrate 51 of the second dimming module 4B are adhered together by a second adhesive layer 03 to form the dimming structure 4. The second adhesive layer 03 may be PVB adhesive. In some examples, the second base substrate 42 of the first dimming module 4A and the first base substrate 51 of the second dimming module 4B may be used as a whole.

Specifically, if the first electrode layer in one of the glass modules includes a plurality of electrode blocks, which is equivalent to dividing liquid crystal molecules in the dimming layer into a plurality of regions; and each electrode block is controlled by an individual driving circuit, so that different voltages can be controlled to be applied to the different electrode blocks, so as to generate different electric fields between respective electrode blocks and the second electrode layer opposite to the electrode blocks, thereby causing different deflection angles of the liquid crystal molecules in the liquid crystal layer corresponding to respective electrode blocks, further causing different transmittances of regions of a liquid crystal cell corresponding to respective electrode blocks, that is, causing different transmittances of different regions of the dimming structure. Similarly, the second electrode layer in one glass module includes a plurality of electrode blocks, so that different voltages can be controlled to be applied to the different electrode blocks, so as to generate different electric fields between respective electrode blocks and the first electrode layer opposite to the electrode blocks, thereby realizing different transmittances of different regions of the dimming structure. Alternatively, the first electrode layer and the second electrode layer in one glass module may include a plurality of electrode blocks, and it should be noted that the electrode blocks in the first electrode layer and the second electrode layer at least partially overlap each other. According to the above method, different transmittances of different regions of the dimming structure may also be realized.

Alternatively, in this embodiment, at least one of the first electrode layer and the second electrode layer of each of the plurality of glass modules may include a plurality of electrode blocks, and respective electrode blocks are controlled by different driving circuits. In this case, in one glass module, different regions have totally different light transmittances. The plurality of glass modules coordinate with each other, so that the light transmittances of respective regions of the dimming structure can be controlled more accurately.

Figure 12:
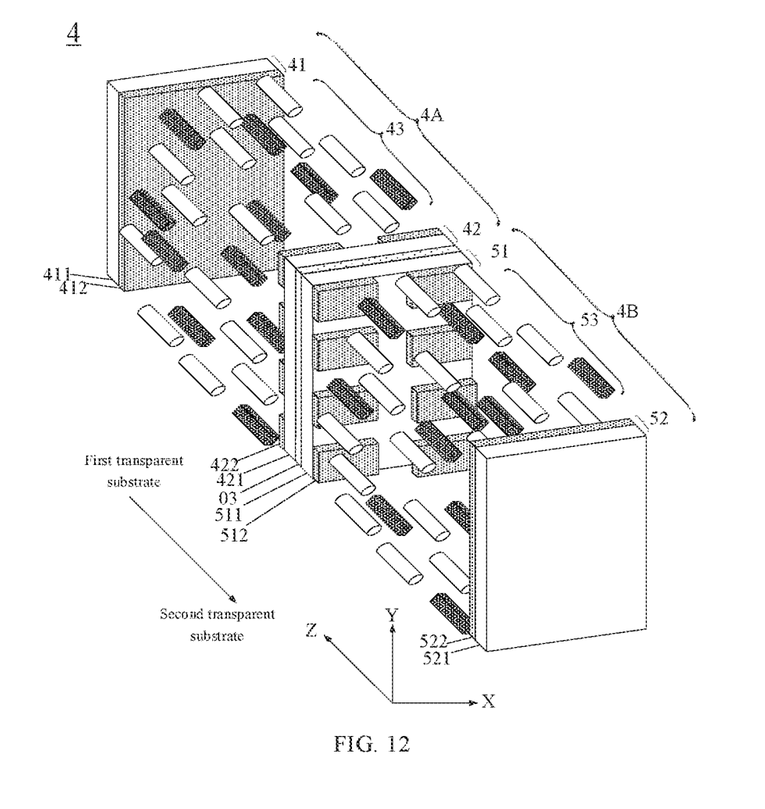
FIG. 12 is a schematic diagram of a structure (block electrode) of a dimming structure of a window system provided by the present disclosure.
Figure 13:
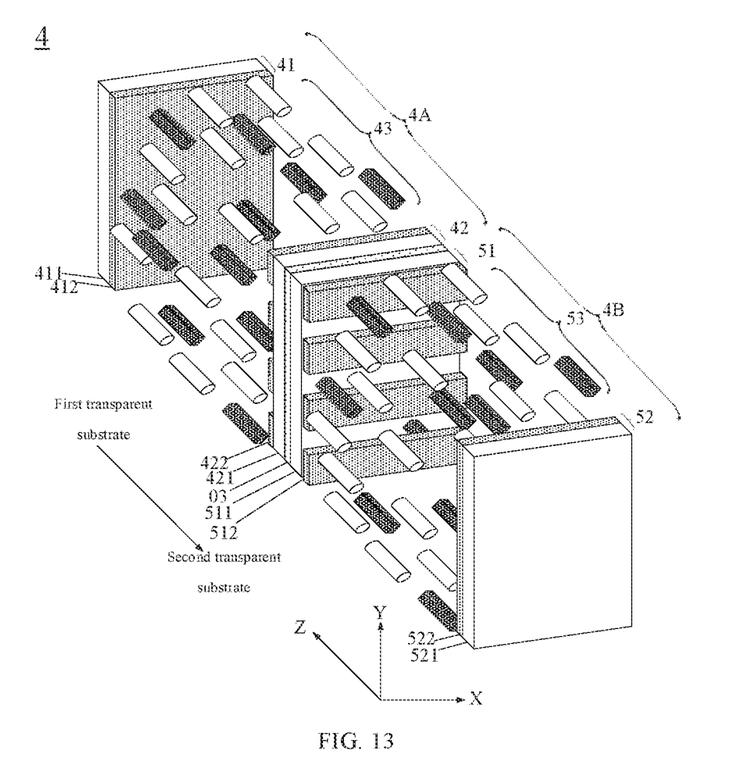
FIG. 13 is a schematic diagram of a structure (stripe electrode) of a dimming structure of a window system provided by the present disclosure.

It should be noted that for one glass module (for example, the first glass module 4A or the second glass module 4B), one of the first electrode layer or the second electrode layer (such as the first electrode layer 412 of the first glass module 4A in FIGS. 12 and 13) may be a planar electrode; and the other one of the first electrode layer or the second electrode layer may include a plurality of electrode blocks, which may be a plurality of block electrodes distributed in an array (for example, as shown by the first electrode layer 412 of the first glass module 4A in FIG. 12), or may be a plurality of strip electrodes arranged side by side (for example, as shown by the first electrode layer 412 of the first glass module 4A in FIG. 13), which may be specifically set according to the partition needs and the driving way, and is not limited herein.

Further, for one glass module, a spacer (not shown) is disposed between the first base substrate and the second base substrate, forming a certain distance between the first base substrate and the second base substrate, to form a space for accommodating liquid crystal molecules. The spacer may include various types, such as a ball spacer or a resin spacer, or the like, which is not limited herein.

It should be noted that only a few structures of the specific implementation of the dimming structure are given above. In fact, as long as one of the first electrode layer and the second electrode layer of one glass module includes a plurality of electrode blocks, and respective electrode blocks are controlled by different driving circuits. In this case, different transmittances of different regions of the dimming structure can be realized. Alternatively, the first electrode layer and the second electrode layer in each glass module include a plurality of electrode blocks, and respective electrode blocks are controlled by different driving circuits. In this case, different transmittances of different regions of the dimming structure can be realized. The operating principle is the same as the above principle, and therefore, the details thereof are not repeated herein.

Alternatively, any of the above dimming structures may further include a first alignment layer (not shown) disposed on a side of the first electrode layer 41 of the first glass module 4A close to the dimming layer 43, and a second alignment layer (not shown) disposed on a side of the second electrode layer 422 of the first glass module 4A close to the dimming layer 43; a third alignment layer (not shown) disposed on a side of the first electrode layer 512 of the second glass module 4B close to the dimming layer 53, and a fourth alignment layer (not shown) disposed on a side of the second electrode layer 522 of the second glass module 4B close to the dimming layer 53; pretilt angles of the first alignment layer and the second alignment layer are the same; pretilt angles of the third alignment layer and the fourth alignment layer are the same; and a difference between each of pretilt angles of the first alignment layer and the second alignment layer and each of pretilt angles of the third alignment layer and the fourth alignment layer is 90°. In this way, when no voltage is applied, the first glass module 4A is orthogonally superposed on the second glass module 4B, so that light-absorbing directions of the liquid crystal molecules in the first glass module 4A and the second glass module 4B are orthogonal to each other, and substantially all of incident light is absorbed according to the Malus law, and a dark state appears.

In some examples, the dimming structure 4 may be adhered to a side of the second transparent substrate 2 close to the first transparent substrate 1 through the third adhesive layer 02. In particular, the third adhesive layer 02 is disposed between a side, away from the first transparent substrate 1, of the fourth substrate of the glass module closest to the second transparent substrate 2 and a side of the second transparent substrate 2 close to the first transparent substrate 1.

In some examples, referring to FIG. 3, the radiation structure 3 includes the first substrate 31 and the second substrate 32 opposite to each other. The first substrate 31 is disposed on a side of the first transparent substrate 1 close to the dimming structure 4, and the second substrate 32 is disposed on a side, close to the first transparent substrate 1, of the third substrate 411 of the glass module closest to the first transparent substrate 1; the feeding structure 33 is disposed on a side of the first substrate 31 close to the second substrate 32; the radiation coupling layer 34 is disposed on a side of the second substrate 32 close to the first substrate 31. For the dimming structure 4, the third substrate 411 of the glass module closest to the first transparent substrate 1 is further used as the second substrate 32 of the radiation structure 3. In this case, the radiation coupling layer 34 of the radiation structure 3 is directly formed on a side, close to the first transparent substrate 1, of the third substrate 411 of the glass module closest to the first transparent substrate 1. If the radiation coupling layer 34 adopts a metal mesh structure, the metal conductive film forming the metal mesh is adhered to a side, close to the first transparent substrate 1, of the third substrate 411 of the glass module closest to the first transparent substrate 1, through a fourth adhesive layer (not shown in FIG. 3), so that a thickness of the window system can be reduced.

In some examples, with continued reference to FIG. 3, the first transparent substrate 1 of the window system provided by the present disclosure is further used as the first substrate 31 of the radiation structure 3, thereby reducing the thickness of the window system.

In summary, the window system provided by the present disclosure can be applied to windows of various buildings or mobile tools or the like, and the radiation structure 3 can be hidden in an interlayer between the first transparent substrate 1 and the second transparent substrate 2, and have a better gain without affecting the light transmittance of the window system.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:
1. A window system, comprising:
a first transparent substrate and a second transparent substrate opposite to each other, and
a radiation structure and a dimming structure sequentially arranged on a side of the first transparent substrate close to the second transparent substrate;
wherein an orthographic projection of the dimming structure on the first transparent substrate at least partially overlaps an orthographic projection of the radiation structure on the first transparent substrate;
wherein the radiation structure comprises:
a first substrate and a second substrate opposite to each other; wherein the first substrate is on a side of the first transparent substrate close to the dimming structure, and the second substrate is on a side of the dimming structure close to the first transparent substrate;
a feeding structure on a side of the first substrate close to the second substrate; and
a radiation coupling layer on a side of the second substrate close to the first substrate, wherein the feeding structure and the radiation coupling layer have a first spacing therebetween;
wherein the radiation coupling layer is provided with a slit; and an orthographic projection of the slit on the second substrate at least partially overlaps with an orthographic projection of the feeding structure on the second substrate;

wherein an arrangement direction of the feeding structure is at least partially different from that of the slit; and wherein the slit comprises a first sub-slit extending along a first direction, and a second sub-slit and a third sub-slit respectively connected to both ends of the first sub-slit and each extending along a second direction, and the first direction intersects with the second direction;

an extending direction of the feeding structure is substantially the same as the first direction, and intersects with the second direction; and the orthographic projection of the feeding structure on the second substrate does not overlap an orthographic projection of the first sub-slit on the second substrate.

2. The window system of claim 1, wherein the radiation coupling layer comprises a plurality of first wires crossing each other and broken at the slit.

3. The window system of claim 2, wherein each of the plurality of first wires comprises a plurality of first sub-wires broken at the slit; and the first sub-wires of different first wires are broken at the slit; or the first sub-wires of different first wires are short-circuited at the slit.

4. The window system of claim 1, wherein the feeding structure comprises a plurality of second wires crossing each other.

5. The window system of claim 4, wherein each of the plurality of second wires comprises a plurality of second sub-wires; and the second sub-wires of different second wires are broken at an edge of the feeding structure; or the second sub-wires of different second wires are short-circuited at the edge of the feeding structure.

6. The window system of claim 1, wherein the radiation coupling layer comprises a plurality of first wires crossing each other and broken at the slit; and the feeding structure comprises a plurality of second wires crossing each other; and wherein orthographic projections of hollowed-out portions formed by the plurality of first wires and hollowed-out portions formed by the plurality of second wires on the second substrate substantially overlap each other.

7. The window system of claim 1, wherein the radiation coupling layer comprises a plurality of first wires crossing each other and broken at the slit; and wherein a unit area of the orthographic projection of the feeding structure on the second substrate is greater than that of an orthographic projection of the radiation coupling layer on the second substrate.

8. The window system of claim 1, wherein the dimming structure comprises at least one glass module, each of which comprises a first base substrate and a second base substrate opposite to each other and a dimming layer; and wherein the dimming layer is configured to adjust light transmittance according to an electric field generated between the first base substrate and the second base substrate; and the second base substrate is closer to the second transparent substrate than the first base substrate.

9. The window system of claim 8, wherein the first base substrate comprises a third substrate, and a first electrode layer on a side of the third substrate close to the second base substrate;

the second base substrate comprises a fourth substrate, and a second electrode layer on a side of the fourth substrate close to the first base substrate; and the dimming layer is a dye-doped liquid crystal layer.

10. The window system of claim 9, wherein the radiation structure comprises: a first substrate and a second substrate opposite to each other;

wherein the first substrate is on a side of the first transparent substrate close to the dimming structure, and the second substrate is on a side, close to the first transparent substrate, of the third substrate of the glass module closest to the first transparent substrate;

the feeding structure is on a side of the first substrate close to the second substrate; and the radiation coupling layer is on a side of the second substrate close to the first substrate; and wherein the third substrate is re-used as the second substrate.

11. The window system of claim 10, wherein the first transparent substrate is re-used as the first substrate.

12. The window system of claim 1, wherein the radiation structure further comprises: a reference electrode layer; and the window system is applied to a window of a vehicle, and a housing of the vehicle is re-used as the reference electrode layer.

* * * * *